April 24, 1951        E. E. VAN HAM        2,550,175
DIRECT READING GAUGE FOR COLD FLUIDS
Filed Feb. 8, 1950        2 Sheets—Sheet 1
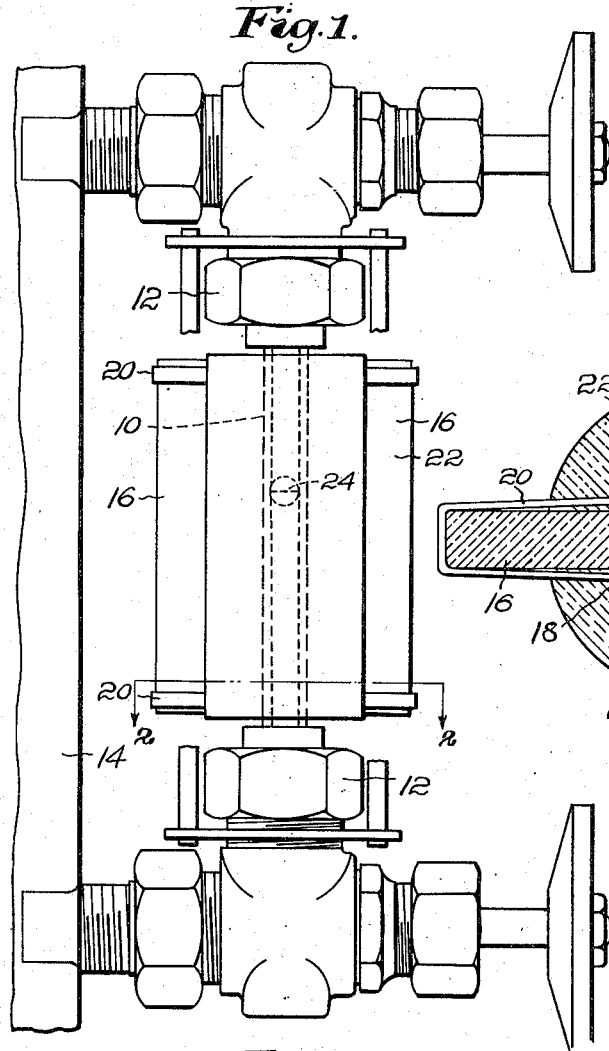
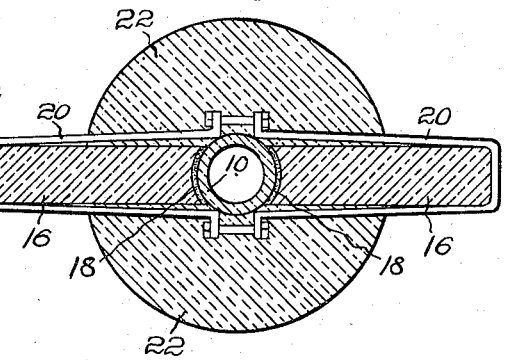
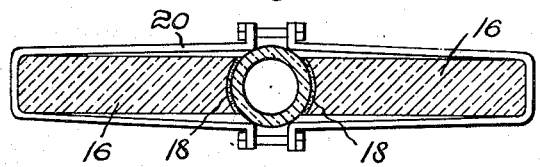
Inventor:
Ernest E. Van Ham

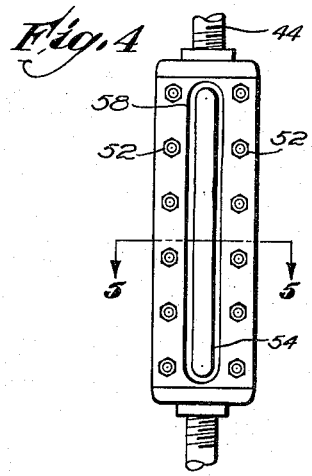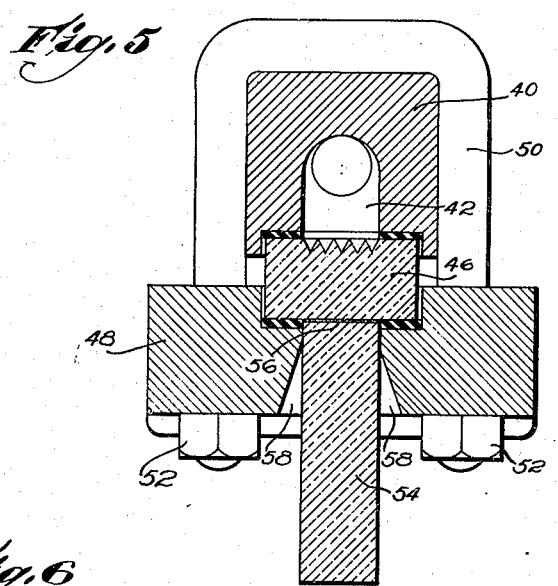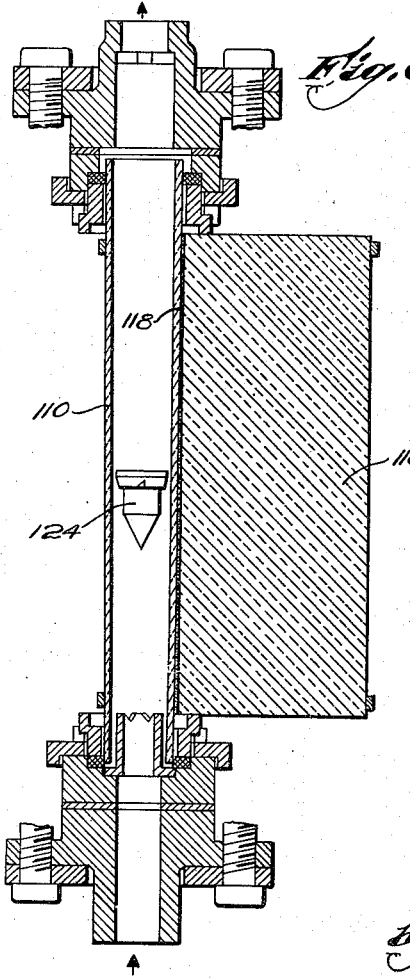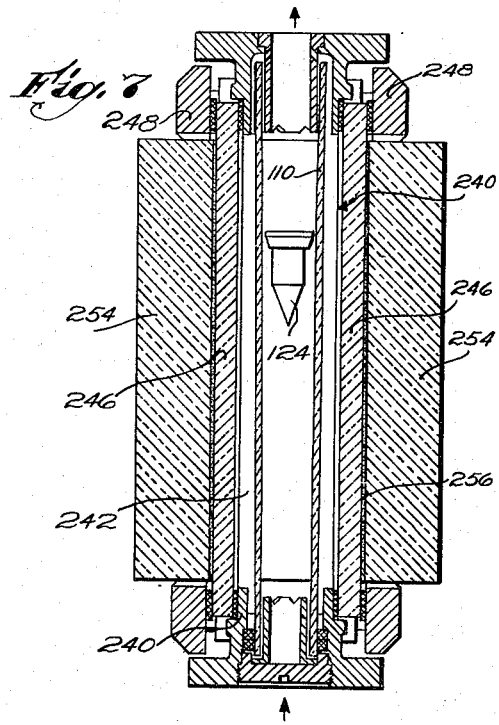

Patented Apr. 24, 1951

2,550,175

UNITED STATES PATENT OFFICE 2,550,175

DIRECT READING GAUGE FOR COLD FLUIDS

Ernest E. van Ham, Somerville, Mass., assignor to Jerguson Gage & Valve Company, Somerville, Mass., a corporation of Massachusetts Application February 8, 1950, Serial No. 143,021

10 Claims. (Cl. 73—323)

1

This invention relates to instruments for use in measuring conditions of a fluid of the type wherein the fluid itself or some indicator carried by the fluid is directly observed by the eye through a suitably transparent glazing. Perhaps the most familiar example is the common "gage glass" for indicating liquid levels wherein a chamber (which may be a glass tube) having a transparent wall is connected to a liquid container above and below the normal level of liquid therein. Roughly speaking and subject to qualifications well understood by those skilled in the art the liquid column in the chamber stands at the same level as the liquid in the container and height of the former may be directly observed to give information as to the latter. The reading may be directly from the meniscus or from an indicator supported by the column. Another example is a flow meter of the so-called cone and ball type wherein fluid flows upwardly through a flaring tube and positions at variable elevations corresponding to the rate of flow an indicator, commonly termed a "rotor," received in the fluid. Both the constructions just referred to are types of differential pressure gages.

When such instruments are used with very cold fluids frost condenses from the outer atmosphere on the transparent wall and prevents the desired observation. The object of the invention is to provide a construction which will obviate this.

My invention will be well understood by reference to the following description of the illustrative embodiments thereof shown in the accompanying drawings, wherein:

Fig. 1 is a side elevation of a liquid level gage with a cylindrical gage glass;

Fig. 2 is the section on the line 2—2 of Fig. 1 on an enlarged scale;

Fig. 3 is a view similar to Fig. 2, showing a modified construction;

Fig. 4 is a front elevation of another type of liquid level gage suitable for high pressures;

Fig. 5 is a transverse section on line 5—5 of Fig. 4 on an enlarged scale; and

Figs. 6 and 7 are vertical sections through flowmeters of the cone and ball type.

Referring now to Fig. 1 of the drawing, I there show a gage of well-known type, comprising the cylindrical gage glass 10 extending between two fittings 12, by means of which the interior bore of the glass is placed in communication with a liquid container 14 at points respectively above and below the normal maximum and minimum levels thereof. A cylindrical glass is a desirable

2 container for the liquid column because of its simplicity and because the high development of the art provides us with glasses of great strength and high dimensional stability as standard articles of commerce convenient to obtain. The features of construction so far described are conventional and not in themselves new to this application.

If a gage as described is used with liquids of sub-freezing temperature (and we may be concerned with liquids having a temperature of −40° or lower) frost condenses from the air on the exterior face of the intensely chilled glazing and soon obscures vision therethrough. In accordance with the invention a simple and effective construction is provided to obviate such condensation.

Referring now more particularly to Figs. 1 and 2 of the drawing, I there show, mounted on the exterior of the glass 10 at diametrically opposite points two sight elements 16 which are transparent blocks of generally quadrilateral form (that is, the longitudinal and transverse sections thereof are approximately rectangular), of suitable transparent material of low heat conductivity (relative to glass) and desirably of low density, as will be more fully described hereinafter. These are elongated axially of the gage and of restricted transverse dimension. In the embodiments of the invention shown a single block extends throughout the height of the tubular glass 10, or at least throughout such zone of its height where it is desired to observe the various heights of the liquid column. The blocks are of substantial radial depth as will hereinafter be more fully explained. They make intimate contact with the exterior surface of the glass and to insure this contact and prevent the development of frost between the surfaces, they may be secured thereto by cement 18. A cement which will remain permanently tacky, so as to permit a slight slip between the surface of the glass 10 and the opposed surface of the sight element 16 is desirable to permit differential expansion due to changes of temperature. Suitable cements based on silicone resins are available. Since the sight elements 16 may be very light, as hereinafter explained, and are subject to no pressure, such cement would hold them in place, but I have herein shown them also mechanically supported by the simple clamping bands 20, arranged adjacent their upper and lower ends respectively. Such bands being small in section and located as they are the flow of heat therethrough is negligible.

Various materials may be used for the blocks 16 provided they have adequate transparency and sufficiently low thermal conductivity. Desirably also they should be of light weight. Very satisfactory results are obtained by the use of transparent methyl-methacrylate resin such as that known by the commercial name of "Lucite." This is transparent, has a thermal conductivity roughly one-third that of glass, and a specific gravity about one-half that of glass. Other synthetic resins of transparent form might be employed, among which may be mentioned cast phenolics, polystyrene and cellulose acetate polymers. Cellulose acetate butyrates in colored forms have low thermal conductivity and probably also in the transparent forms, as to which I have no specific information. Obviously other materials may now exist or be hereafter synthesized which could be employed, and a simple consideration of their pertinent optical and thermal properties will determine the fact.

The parts of the glass 10 not covered by the blocks may receive a covering 22 of a suitable heat insulator of high value. Conveniently a composition comprising cork and a binder may be plastered on and allowed to become set in situ. The insulating material 22 may be of much lower heat conductivity than the block 16. The suggested cork compound would have a conductivity about one-fifth that of the methyl-methacrylate resin.

The radial depth of the block 16 is substantial so that conduction of heat from the outer face thereof to the body of liquid in the glass will be so small as to preclude direct deposit of frost on such face in significant degree to interfere with vision. In general it will then project beyond the insulation 22 and its sides will form abrupt angles with the outer surface of the insulating layer. Any deposit of frost which might take place on the outside of the insulating layer will not accumulate sufficiently to creep in over the front face of the block. In general, however, the insulation 22 will be adequate to prevent significant frosting.

In Fig. 3 I have shown the insulation 22 omitted. It will be understood that frost itself is a good insulator, and a deposit thereof after reaching a certain depth, tends to glaze over on the outside, the outermost surface reaching a freezing-melting balance with the exterior atmosphere after which little additional accretion will take place. The desirable depth of the block 16 is in excess of such depth and therefore the accumulation of frost would build up to a thickness corresponding generally to that of the applied insulating layer 22 in Fig. 2. Thus, in a structure originally organized as shown in Fig. 3, an insulating layer of frost corresponding in function and position to the insulating layer 22 in Fig. 2, will be built up when the gage is put in use. These two figures may be taken to show two extreme constructions, Fig. 2 one where insulation is applied to prevent frost, and Fig. 3 where the frost is permitted to accumulate, but inwardly of the outer faces of the block 16, to provide insulation. An intermediate case would be one where the applied insulating layer was not completely effective to prevent frosting on its exterior, in which case it would be supplemented by the filmed-over layer of frost accumulating on its exterior surface.

The use of two blocks 16 at diametrically opposite points of the gage tube 10 is preferred, as this permits transmission of light, facilitating observation of the column. In the ordinary case the block or blocks would be of a height to cover the entire height of the column to be observed throughout its range of variation, instead of providing individual, vertically displaced but cooperating sight elements.

The drawing illustrates an actual construction which has been found completely suitable for a liquid having a temperature of 40° below zero. In this instrument the outer diameter of the tubular glass 10 was ¾ of an inch and the block 16 of methyl-methacrylate resin two inches deep. It will be understood that these dimensions are illustrative merely.

In Fig. 1 I have illustrated a float 24 on the surface of the liquid column serving as a readily observed indicator of the value of the head of liquid. The use of such an indicator positioned in accordance with the value of the variable condition is well known in liquid-level gages.

In Figs. 4 and 5 there is shown another wellknown type liquid level gage and one adapted for use with high pressures. It comprises a substantial metal body 40 having a chamber 42 ported at both ends to provide for placing it in communication, as by means of pipes 44 indicated in Fig. 4, with the body of liquid to be gaged above and below the normal maximum and minimum levels thereof. The chamber is open at at least one side (and herein there is shown, by way of example, a gage of the single glass type), the opening being closed by a heavy glazing 46 and frame-like cover 48 cooperates with the margins of the glazing 46 and clamps it in position, herein by means of the U-bolts 50 and cooperating nuts 52. In the example shown the arms of the U-bolts lie adjacent the sides of the body 40 and reinforce it against internal pressure.

The features of construction shown in Figs. 4 and 5 as so far described are conventional and not in themselves new to this application.

If a gage as described is used with liquid of subfreezing temperature, such as previously referred to, frost condenses from the air on the exterior face of the intensely chilled glazing and soon obscures vision therethrough. Furthermore, although such action is not so obvious, the frame 48 becomes exceedingly cold and frost builds up thereon and tends to fill up the sight opening in the frame.

In accordance with my invention the outer face of the glazing 46 throughout the area thereof exposed at the opening of frame 48 is provided with an extension or addition 54 which is likewise transparent and of such depth that its outer face will not be chilled to condensing temperatures by conduction to the interior or to the metal parts of the gage and projecting beyond the front face of the frame 48 for such a distance that frost accumulating on the frame will not work in over the outer face. The glazing 46 may be the conventional glass as ordinarily used for a gage of like type and size not merely for convenience and interchangeability but because such glasses have the strength and the stability of form necessary to withstand the internal pressures in the gage and the clamping pressures exerted by the frame 48. The extension 54, which corresponds to the blocks 16 in the modification of Figs. 1 and 2, however conveniently may be like those blocks 16 a separate piece of transparent material of lesser strength and stability but conveniently of relatively low heat conductivity, as for example transparent methyl-methacrylate resin such as that known by the commercial name of "Lucite."

The extension 54 is a cross-section to cover the face of the glazing 46 where exposed in the opening of the frame as seen in Fig. 5. As it is subject to no pressure, simple means will suffice for mounting it. Herein I show it secured by means of cement 56 to the outer face of the glass, as in the case of the cement 18 securing blocks 16 in the modification of Figs. 1 and 2. What has been said about the nature and functions of the cement film 16 applies equally to the cement film 56.

The internal margins of the frame opening which confront the sides of the extension 54 may be beveled at the exterior as consistent with the retention of proper strength in the portions directly engaging the face of glazing 46, to provide clearances 58 minimizing heat transfer between the extension and the cold frame 48, the area of close approximation being of relatively slight depth adjacent the face of the glazing 46. The extension 54, however, as clearly seen in Fig. 5 is made of a depth several times the depth of the area just referred to and forms a rib projected outward for a considerable distance beyond the exterior face of the frame and beyond the attaching nuts 52 which also accumulate frost. Hence frost building up on the exterior of the frame or accumulating in the clearances 58 along the lateral sides of this rib, is prevented by the extending rib from going across from one face of the frame to the other. A depth of rib sufficient for this latter purpose will also preclude direct deposit of frost in significant degree on the outer face of the rib due to heat conduction from said outer face.

A deposit of frost after reaching a certain depth tends to glaze over on the outside, the outermost surface reaching a freezing-melting balance with the exterior atmosphere, after which little additional accretion will take place. The depth of the barrier rib provided by the extension 54 is in excess of such depth. Practically it will be found unnecessary to clean the frost from the gage from time to time. The maximum accumulation is harmless and the view of the liquid column is indefinitely preserved.

Figs. 4 and 5 of the drawing illustrate an actual construction which has been found completely suitable for a liquid having a temperature of 40° below zero. In this instrument the transverse width of the chamber 42 is ⅜", the frame 48 is steel ½" thick, while the depth of the extension 54 (of methyl-methacrylate resin) from the face of the glazing 46 to its outer face is 2". It will be understood that these dimensions are illustrative merely.

Referring now to Fig. 6, I there show a flow meter of the cone and ball type, modified in accordance with the invention. Such a flow meter may comprise a glass tube 110 the interior bore of which flares slightly upwardly, and a "rotor" 124 received therein. A stream of fluid, either the stream which it is desired to measure or a by-pass therefrom the flow in which is proportional to the main flow being metered, passes upwardly through the tube. The rotor defines a restriction between itself and the adjacent walls of the tube. If the rotor were stationary a differential pressure would be exerted thereon, depending upon the rate of flow. Since it can move in the tube it will so move, altering the effective area of the restriction until the differential between the upward and downward pressures is balanced by the weight of the rotor. The vertical position of the rotor thus indicates the rate of flow.

When used with cold fluids the same problems arise as in the case of the gage shown in Figs. 1, 2 and 3, and in Fig. 6 I have shown an extension 116, in all respects comparable to the extension 16 in those figures, secured to the glass 110 by cement 118. The last two digits of the reference numerals in Fig. 6 are the same as the numerals on corresponding parts of Figs. 1, 2 and 3.

In Fig. 7 there is shown an instrument of the type just discussed for use in metering fluids which are extremely hazardous or under abnormally high pressures. It embodies a tapered glass tube 110 and a rotor 124 similar to those in Fig. 6. The tube 110 extends through a slot 242 in a metal body member 240 of substantial construction, the sides of the slot being closed by heavy glazings 246 secured by frame-like covers 248. The metered fluid is allowed to leak into the space around the metering tube 110 so that the pressures on the tube are balanced. The liquid makes contact with the interior of the glazings 246. Carried by these glazings are extensions 254 which may be in all respects like the extension 54 described in connection with Figs. 4 and 5 and cooperating with the frames 248 as that extension does with the frame 48 in those figures. Here again the last two digits are the same as reference numerals on analagous parts in other figures.

This application is a continuation in part of my applications Serial Nos. 25,812 and 41,035 filed May 8, 1948 and July 28, 1948 respectively, both of which are now abandoned.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. An indicating instrument for use with cold liquids of the type which embodies a container for liquid at least a part of the wall of which is a transparent glazing providing for direct ocular inspection of the liquid behind the glazing characterized by the fact that there is mounted on the glazing with its inner side in intimate contact with the exterior thereof a block of transparent material of relatively low heat conductivity, the block being of substantial depth radially of the glazing to preclude chilling of its outer face to condensing temperatures by conduction to the glazing and disposing said face beyond the thickness of frost accumulating on laterally adjacent portions of the container.

2. An indicating instrument for use with cold fluids of the type which embodies a container for fluid a part of the wall of which is a transparent glazing providing for direct ocular inspection of the interior of the container at the rear of the glazing there being a movable indicator received in the fluid in the rear of the glazing to indicate by its movement changes in a variable condition of the fluid characterized by the fact that there is mounted on the glazing with its inner side in intimate contact with the exterior thereof a block of transparent material of relatively low heat conductivity, the block being of substantial depth radially of the glazing to preclude chilling of its outer face to condensing temperatures by conduction to the glazing and disposing said face beyond the thickness of frost accumulating on laterally adjacent portions of the container.

3. An indicating instrument for use with cold liquids of the type which embodies a container for liquid at least a part of the wall of which is transparent to provide for direct ocular inspection of the liquid within the container, said container consisting of a tubular glass to receive the liquid having mounted thereon at diametrically opposite points with their inner sides in intimate contact with the glass a pair of generally quadrilateral blocks of transparent material of relatively low heat conductivity, each block being of substantial depth radially of the glass to preclude chilling of its outer face to condensing temperatures by conduction to the glass, and disposing said face beyond the thickness of frost accumulating on laterally adjacent portions of the gage.

4. An indicating instrument for use with cold liquids of the type which embodies a container for liquid at least a part of the wall of which is transparent to provide for direct ocular inspection of the liquid within the container, said container consisting of a tubular glass to receive the liquid having mounted against at least one side thereof and with its inner side in intimate contact with the exterior of the glass a generally quadrilateral block of transparent material of relatively low heat conductivity, heat insulating material covering the glass laterally of said block, the block projecting radially beyond said material and being of substantial depth radially of the glass to preclude chilling of its outer face to condensing temperatures by conduction to the glass.

5. An indicating instrument for use with cold liquids of the type which embodies a container for liquid at least a part of the wall of which is transparent to provide for direct ocular inspection of the liquid within the container, said container consisting of a tubular glass to receive the liquid, a covering of heat insulating material surrounding the glass the continuity of which is interrupted by an axially elongated and transversely narrow sight element let into the same along the axial distance corresponding to the range to be observed, the sight element being of transparent material of relatively low heat conductivity relative to the glass and bearing directly on the exterior surface thereof, the element being of substantial depth to position its outer face radially distant from the glass to preclude chilling of its outer face to condensing temperature and beyond any thickness of frost accumulating on the exterior of covering.

6. An indicating instrument for use with cold liquids of the type which embodies a container for liquid at least a part of the wall of which is transparent to provide for direct ocular inspection of the liquid within the container, said container consisting of a tubular glass to receive a liquid column, a covering of heat insulating material surrounding the glass the continuity of which is interrupted by a plurality of cooperating sight elements aligned with the liquid column throughout the range of levels to be observed and let into the insulating material, the sight elements being of transparent material of relatively low heat conductivity relative to the glass and bearing directly on the exterior surface thereof, each element being of substantial depth to position its outer face radially distant from the glass to preclude chilling of its outer face to condensing temperature and beyond any thickness of frost accumulating on the exterior of covering.

7. An indicating instrument for use with cold liquids of the type which embodies a container for liquid at least a part of the wall of which is transparent to provide for a direct ocular inspection of the liquid within the container, said container consisting of a chambered body, a glazing cooperating therewith to provide a receptacle for the liquid, a frame-like cover overlying the margins of the glazing and clamping it to the body, the opening in the frame providing for exposing the glazing to permit inspection of the interior of the chamber and a body of transparent material of relatively low heat conductivity mounted against the outer face of the exposed portion of the glazing to cover the same and projecting through the opening in the frame and beyond the plane of the outer face thereof for a substantial distance to provide a frost barrier.

8. An indicating instrument for use with cold liquids of the type which embodies a container for liquid at least a part of the wall of which is transparent to provide for direct ocular inspection of the liquid within the container, said container consisting of a chambered body, a glazing cooperating therewith to provide a receptacle for the liquid, a frame-like cover overlying the margins of the glazing and clamping it to the body, the opening in the frame providing for exposing the glazing to permit inspection of the enclosed liquid and a body of transparent material of relatively low heat conductivity mounted against the outer face of the exposed portion of the glazing to cover the same and projecting through the opening in the frame and beyond the plane of the outer face thereof for a substantial distance to provide a frost barrier, the margin of the frame opening being bevelled to provide a space between the frame and said body throughout at least a major portion of the confronting areas of the two.

9. An indicating instrument for use with cold liquids of the type which embodies a container for liquid at least a part of the wall of which is transparent to provide for direct ocular inspection of the liquid within the container, said container consisting of a chambered body, a glazing cooperating therewith to provide a receptacle for the liquid, a frame-like cover overlying the margins of the glazing and clamping it to the body, the opening in the frame providing for exposing the glazing to permit inspection of the enclosed liquid and a body of transparent material of relatively low heat conductivity secured to the face of the glazing by a permanently tacky intervening layer of adhesive permitting relative movements of the parts in their plane of juncture, the body covering the exposed surface of the glazing and projecting through the opening in the frame and beyond the plane of the outer face thereof for a substantial distance to provide a frost barrier.

10. An indicating instrument for use with cold liquids of the type which embodies a container for liquid at least a part of the wall of which is transparent to provide for direct ocular inspection of the liquid within the container, said container consisting of a body having a chamber to receive a liquid, there being at least one opening through the body to the chamber to provide for inspection of the enclosed liquid, a transparent closure for the opening having a flange at its inner side overlying the margin of the opening, a frame-like cover overlying the flange and clamping the closure against the body, at least the inner portion of the closure including said flange being of strong, rigid material, the portion of the closure which is disposed interiorly of the flange projecting through the opening of the frame and beyond the plane of the outer face thereof for a substantial depth precluding chilling of the outer face to condensing temperatures by conduction to the chamber and the frame and disposing said face beyond the thickness of frost accumulating on the frame.

ERNEST E. VAN HAM.

REFERENCES CITED

The following references are of record in the file of this patent:

UNITED STATES PATENTS

| Number | Name | Date |
|---|---|---|
| 1,473,741 | Sargent | Nov. 13, 1923 |
| 1,976,783 | Harding | Oct. 16, 1934 |

FOREIGN PATENTS

| Number | Country | Date |
|---|---|---|
| 506,546 | Germany | Dec. 17, 1929 |